United States Patent [19]

Haberl et al.

[11] Patent Number: 5,066,315
[45] Date of Patent: Nov. 19, 1991

[54] METHOD OF CLEANING A CYCLONE SEPARATION AND CYCLONE SEPARATOR FOR PRACTICING THE METHOD

[75] Inventors: Johann Haberl, Skärholmen; Gösta Lundqvist, Grödinge, both of Sweden

[73] Assignee: Dustcontrol International AB, Norsborg, Sweden

[21] Appl. No.: 488,049
[22] PCT Filed: Nov. 18, 1988
[86] PCT No.: PCT/SE88/00628
§ 371 Date: May 21, 1990
§ 102(e) Date: May 21, 1990
[87] PCT Pub. No.: WO89/04711
PCT Pub. Date: Jun. 1, 1989

[30] Foreign Application Priority Data

Nov. 20, 1987 [SE] Sweden .................................. 8704568

[51] Int. Cl.$^5$ .............................................. B01D 46/00
[52] U.S. Cl. .......................................... 55/96; 55/302; 55/337; 55/432
[58] Field of Search .............. 55/96, 302, 337, 429, 55/432, 459.5

[56] References Cited

U.S. PATENT DOCUMENTS

| | | | |
|---|---|---|---|
| 3,388,534 | 6/1968 | Jensen | 55/302 |
| 3,394,532 | 7/1968 | Oetiker | 55/341.1 |
| 3,541,764 | 11/1970 | Astrom | 55/302 |
| 4,120,674 | 10/1978 | Haag et al. | 55/432 |
| 4,336,040 | 6/1982 | Haberl | 55/429 |

FOREIGN PATENT DOCUMENTS

| | | |
|---|---|---|
| 8203340 | 10/1982 | PCT Int'l Appl. |
| 8303556 | 10/1983 | PCT Int'l Appl. |
| 8007136-8 | 10/1982 | Sweden |
| 8202223-7 | 7/1984 | Sweden |
| 8500599-9 | 9/1986 | Sweden |

Primary Examiner—Jay H. Woo
Assistant Examiner—C. Scott Bushey
Attorney, Agent, or Firm—Berman & Aisenberg

[57] ABSTRACT

A cyclone separator has a filter unit which is disposed inside a central outlet between an inlet chamber of the cyclone separator (for gas mixed with dust) and an outlet chamber thereof (for clean gas) connected to a suction source. A method is provided for cleaning such a cyclone separator by momentarily establishing a connection between the outlet chamber and the atmosphere. The communication between the inlet chamber and the suction source being maintained, to initiate a rapid pressure rise in the outlet chamber and thus a reverse gas flow through the filter unit. The outlet chamber of the cyclone separator has a valve controlled aperture for connecting the outlet chamber to the atmosphere, a closure member of the valve being biased to a closed position by existing pressure difference between the outlet chamber and the atmosphere.

9 Claims, 2 Drawing Sheets

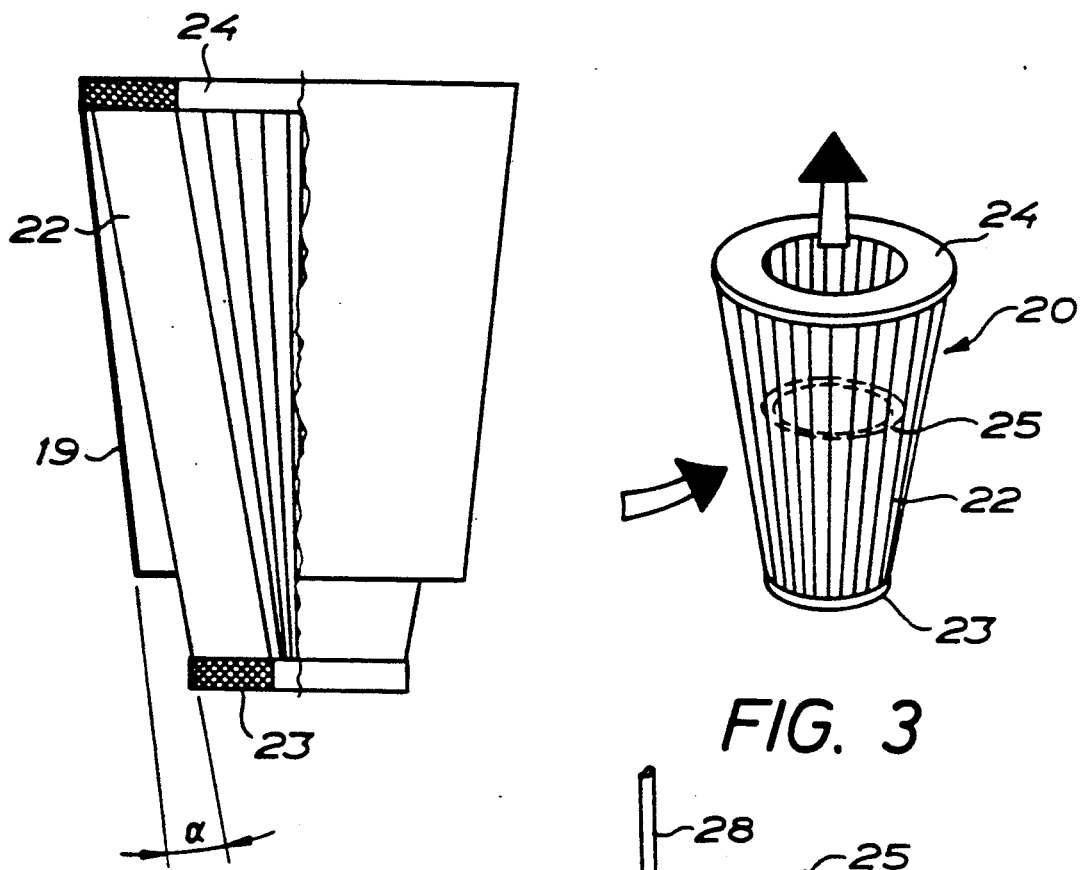
FIG. 2
FIG. 3
FIG. 4
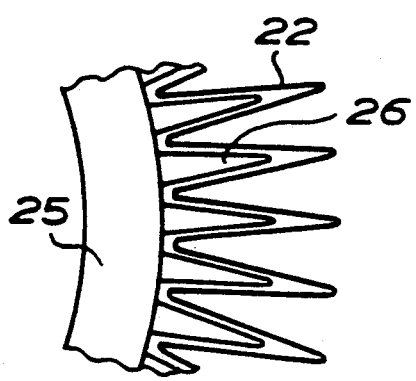
FIG. 5
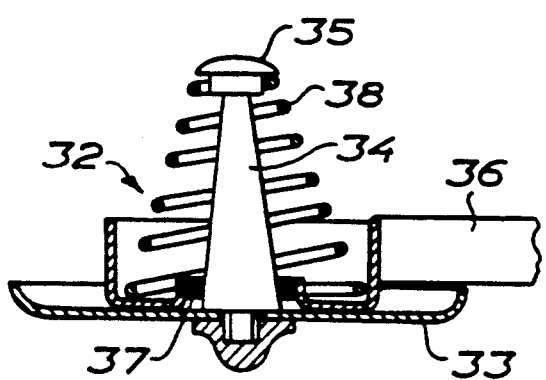
FIG. 6

METHOD OF CLEANING A CYCLONE SEPARATION AND CYCLONE SEPARATOR FOR PRACTICING THE METHOD

FIELD OF THE INVENTION

The invention relates to cyclone separators comprising a filter unit disposed inside a central outlet between the inlet chamber of a cyclone separator for gas mixed with dust, and an outlet chamber thereof for cleaned gas, connected to a suction source, and more particularly to a method of cleaning such a cyclone separator, gas flow through the filter being reversed when required in order to blow the filter.

The invention also relates to a cyclone separator of the type referred to above for practising the method of the invention.

BACKGROUND

SE-C-8202223-7 discloses a cyclone separator of the kind referred to herein, in which the filter unit comprises a truncated conical folded filter unit disposed inside a central tube connected to the central outlet, said tube entirely surrounding the filter unit. The filter unit is braced internally by means of a perforated tube of a rigid material supporting the filter unit at the inner folds, an annular gap being provided between the filter unit and the central tube. The central tube and the filter unit form a compact unit, which is resiliently suspended by means of a rubber diaphragm, so that the filter unit can be easily shaken to clean the filter surface. Dust particles adhering to the folded filter surface then easily fall out through the central tube to accumulate in the dust pocket at the bottom of the cyclone separator.

Generally, some mechanical shaking equipment of the vibrator type, an impact device or the like is used for shaking the filter unit, but the arrangement of such shaking equipment makes the Cyclone separator more complicated, and the shaking is not always effective enough to clean the filter unit.

It has been proposed in connection with dust separators having a filter unit disposed inside a central outlet between an inlet chamber for gas mixed with dust, and an outlet chamber for cleaned gas, connected to a suction source, to clean the filter unit by reversing the gas flow through the filter unit. Such a dust separator is disclosed in SE-B-8500599-9. For cleaning, the connections of the dust separator are reversed by means of two throttles so that the inlet chamber, which normally shall receive gas mixed With dust, will be connected to the suction source, and the outlet chamber instead will be the inlet chamber. Thus, the suction source will temporarily draw through the filter unit in a direction opposite to the normal direction to blow the filter unit. To effect the blowing in this manner implies complicated piping and throttle devices which are not particularly well suited for small and medium-sized cyclone separators.

As to textile barrier filters it has been proposed to utilize the pressure difference between the atmospheric pressure and the negative pressure in the filter to generate a reversed gas flow through the filter. This is described in SE-C-8007136-8. According to this publication a number of filter cartridges are each connected to an individual drum which has a side outlet to an outlet chamber for cleaned gas and opens, through an end opening, into an air reservoir at atmospheric or positive pressure. The opening is normally closed from the inside by means of a valve flap which is kept in a closed position against the pressure in the air reservoir by means of an operating device but can be swung from the closed position to another position in which the connection to the air reservoir is open, the connection of the drum to the outlet chamber for cleaned gas being closed, however. For cleaning, the valve flap is swung to said latter position to provide momentarily a reversed flow of air through the filter in order to blow the filter on equalizing the pressure difference between the air reservoir and an inlet chamber for gas mixed with dust, in which the filter cartridges are disposed. Then, the filter cartridges are cleaned one at a time, while the other cartridges are working normally filtering the supplied gas mixed with dust.

SUMMARY OF THE INVENTION

The invention is based on the principle of cleaning a filter described in SE-C-8007136-8, which cannot be applied, however, to a cyclone separator in the way it is carried out according to said publication. In order to apply the principle to cleaning of a cyclone separator the method of the invention is characterized by providing a reverse gas flow through the filter unit by initiating a rapid pressure rise in the outlet chamber. This is accomplished by momentarily establishing a connection between the outlet chamber and the atmosphere while maintaining communication between the outlet chamber and a suction source. By this method the cleaning can be achieved by very simple means and can be carried out, during normal operation of the suction source.

The cyclone separator for practising the method of the invention comprises the an outlet chamber having a valve controlled aperture for connecting it to the atmosphere and wherein a valve closure element is biased to closed position by an existing pressure difference between the outlet chamber and the atmosphere.

BRIEF DESCRIPTION OF THE DRAWINGS

FIG. 2 is a view, one half thereof being a cross-sectional view and one half being a side elevational view, of the filter unit and the central tube, FIG. 3 is a perspective view of the filter unit, FIG. 4 is a perspective view of a supporting ring in the filter unit, FIG. 5 is a fragmentary cross-sectional view of the filter unit with the supporting ring projecting thereinto, and FIG. 6 is an axial sectional view of the shut-off device of the valve-controlled opening for connection of the outlet chamber with the atmosphere.

DETAILS

Figure 1:
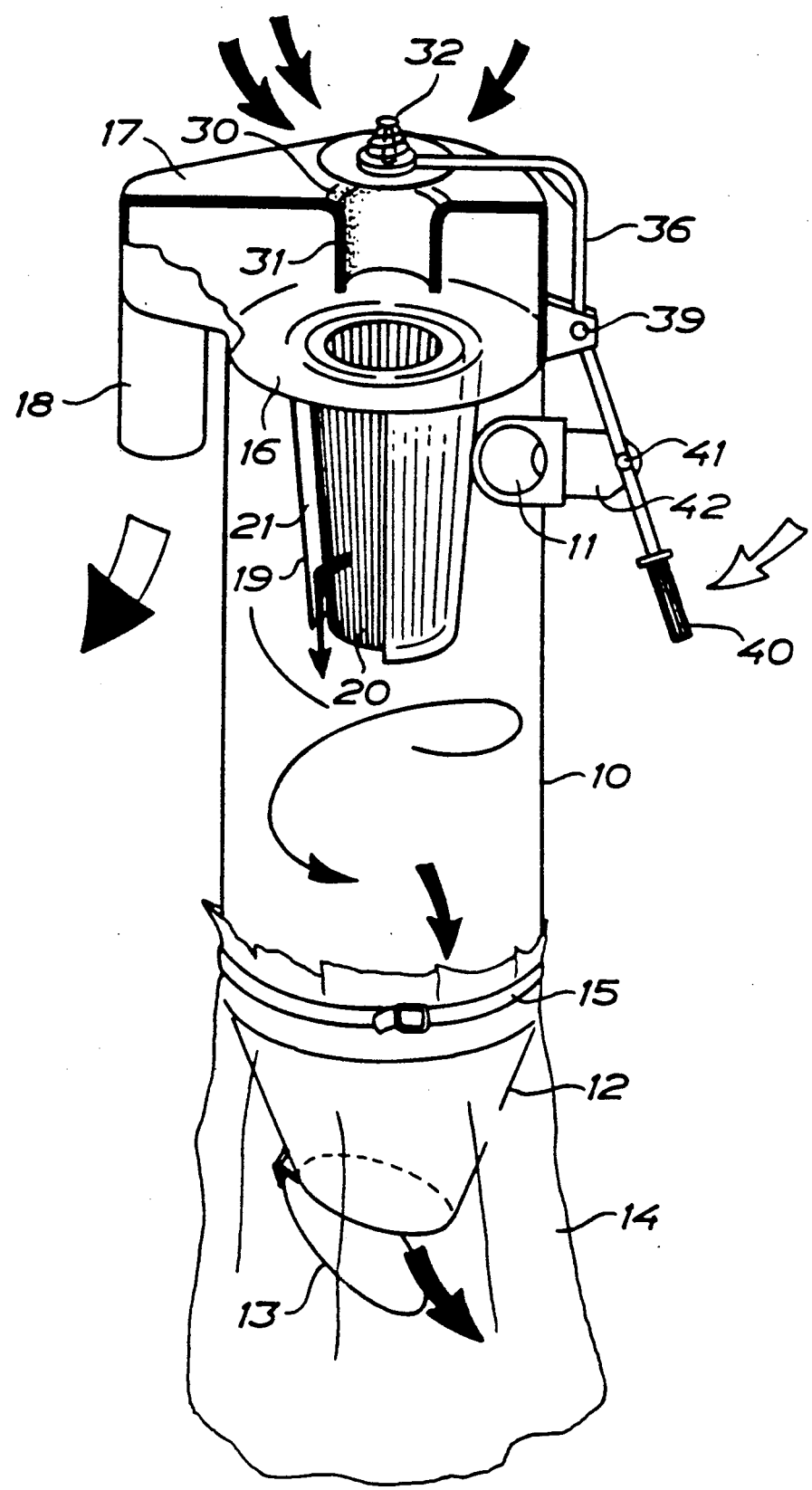
FIG. 1 is a perspective view, partly a sectional view, of a cyclone separator for practising the method of the invention.

In order to explain the invention in more detail, an embodiment thereof is described with reference to the accompanying drawings.

Referring to FIG. 1 the cyclone separator comprises a cylindrical housing 10 having a tangential inlet 11 for gas mixed with dust. The housing 10 connects at the bottom thereof to a bottom cone 12 for collecting separated dust. The bottom cone is provided with a flap valve 13 for draining the dust from the bottom cone. A bag 14 for collecting the drained dust is replaceably connected to the housing 10 by means of a clamp strip 15.

The housing defines an inlet chamber for gas mixed with dust, which is terminated at the top thereof by a partition 16. On top of the housing a cover 17 is provided said cover defining on the other side of the partition an outlet chamber for cleaned gas, provided with an outlet socket 18 to be connected to a suction fan or other suction source. The partition 16 is annular and thus has a central aperture to which a central tube 19 is connected said tube extending downwards into the inlet chamber and narrowing conically towards the lower end thereof. Coaxially inside the central tube a filter unit 20 is mounted which is adjusted to the conical form of the central tube, an annular gap 21 being provided between the central tube and the filter unit.

Referring to FIGS. 2 to 5 the filter unit 20 comprises a folded or pleated filter portion 22 of paper or textile material or of a metal netting, and two end rings 23 and 24 of metal sheet or plastic material. The end rings are glued or otherwise connected to the filter portion at the ends thereof, the folds of the filter portion extending axially between the two end rings. At air flow from the outside of the filter element to the inside thereof a pressure drop will be obtained over the filter portion 22, loading the folds with a pressure force which tends to compress the folds. However, due to the conical shape and due to the fact that the end rings are connected to the filter portion the folds are held in place and are prevented from being compressed by suction; there will be only a slight elastic deflection inwards of the folds. In this manner short filter elements are sufficiently stable notwithstanding the lack of an inside support basket for example formed by a perforated tube, but when longer filter elements are concerned it may be necessary to brace the filter element by means of a support ring 25. e.g. of the embodiment shown in FIG. 4. This support ring has a number of spikes 26 which project radially from the outside of the support ring. Such spikes are provided in a number corresponding to the number of folds of the filter element. The support ring can be pressed into the filter element the spikes being inserted into the folds, and preferably the support ring is located where the greatest compression of the filter element by suction can be expected. The spikes spread the folds so that the elastic deflection mentioned above will be amplified and the folds accordingly cannot be compressed by suction as a Whole or between the support ring and one or the other of the end rings. The support ring forms an upward collar 27 so that it is concave on the upper side thereof, and the reason for shaping the support ring in this way will become apparent below. In case of larger filter elements the support ring can be kept in place by one or more support rods 28 which can engage or be connected to the end rings 23 and 24. It is also conceivable to arrange more than one support ring.

The cover 17 forms an aperture 30 a socket 31 connecting to said aperture on the lower side of the cover. The aperture as well as the socket are arranged coaxially With the central tube 19 and the filter element 20. The aperture is controlled by means of a valve 32 mounted at the outside of the cover, said valve being shown in more detail in FIG. 6. The valve comprises a valve disk 33 to be sealingly engaged with the outside of the cover over the aperture 30. During the operation of the cyclone separator there exists a negative pressure in the outlet chamber defined by the cover 17 so that the disk 33 will be sucked against the outside of the cover over the aperture 30. A conical pin 34 is attached to the valve disk 33 and terminates at a head 35, and an operating arm 36 is displaceably guided on said pin by means of a bearing 37. A conical compression spring 38 is engaged between the head 35 and the arm and biases the operating arm 36 towards the valve disk 33. The operating arm can be displaced along the pin 34 towards the head 35 compressing the spring 38, and due to the fact that the pin 34 is conical the arm can move along the pin without friction existing between the pin and the bearing 37. The operating arm is pivoted to the cover 17 at 39 and is provided with an operating handle 40. Furthermore, the arm is coupled at 41 to a closure slide 42 for the tangential inlet 11. When the operating arm is in the position shown in FIG. 1 the tangential inlet is open and the aperture 30 is closed.

This is the normal operating condition of the cyclone separator, the tangential inlet 11 being connected to the place from which gas mixed with dust shall be supplied to the cyclone separator, and the socket 18 being connected to the suction source. Accordingly, a negative pressure exists in the inlet chamber defined by the housing 10, as well as the outlet chamber defined by the cover 17. The gas mixed with dust, which is supplied to the separator will be rid of dust particles according to the cyclone principle when whirling around in the inlet chamber the dust particles falling down into the bottom cone 12 where they will be collected. The gas escapes through the central tube 19 via the filter element 20 to the outlet chamber, fine dust particles which cannot be separated by cyclone action sticking to the filter surface. Due to the folded filter construction the filter surface is relatively large and the flow losses are relatively low so that large amounts of fine dust can be separated on the filter element.

When the filter element is to be cleaned no change is made in the operation of the cyclone apparatus which will stay connected at the tangential inlet and the outlet socket in the manner mentioned above, the suction source also during the cleaning procedure having the suction side thereof connected to the outlet chamber. The operating arm 36 will be pressed downwards, the spring 38 being compressed between the arm and the head 35 during displacement of the bearing 37 along the conical pin 34 because the valve disk 33 will be held in place against the cover 17 by the negative pressure in the outlet chamber. When the spring 38 is completely or substantially completely compressed the suction force acting on the valve disk 33 will be overcome so that the aperture 30 will be rapidly uncovered and the outlet chamber will be connected to the outside atmosphere. The opening process will take place very rapidly due to the spring, and the consequence thereof will be that during a very short time air will flow through the aperture 30, socket 31 and the inlet chamber into the filter element, through said element and into the inlet chamber. The arising air shock will knock off the dust coating on the outside of the filter element the freely attached filter portion thereof being deformed outwards and supported by the central tube 19. The cleaning effect on the outside of the filter element will be very strong due to this shock action and deformation of the filter material. Since the aperture 30 and the socket 31 are located in register above the filter the cleaning air will be admitted without losses to the filter element which accordingly will be exposed to an effective blow. The air will be diverted downwards by the central tube 19 and carries the dust particles separated from the filter element downwards. Due to the advantageous construction the air flow downwards will be so heavy that there will exist for a short moment a positive pressure in the inlet chamber where there is normally during operation a negative pressure. The flap 13 therefore will be opened and the dust collected in the bottom cone 12 will be drained into the bag 14. When the operating arm 36 is released the valve disk will again be sucked against the cover 17 to close the aperture 30 so that the cyclone separator is again in the normal operating position thereof.

When the tangential inlet 11 is provided with a closure slide as shown herein the tangential inlet will be closed immediately before or at the same time as the aperture 30 is uncovered, and as a consequence thereof the blowing of the filter element will be improved because the negative pressure in the cyclone separator then will be greater in relation to the existing atmospheric pressure.

The construction of the support ring 25 with an upward collar 27 causes deflection of the cleaning air outwards adjacent the inside of the filter element said air being conducted towards the tips of the spikes 26, a further improvement of the blowing being obtained.

The operating arm 36 can be operated manually but in larger stationary cyclone separators this arm can be provided with a pneumatic or electric servo apparatus.

We claim:

1. A method for cleaning a cyclone separator connected to a suction source and comprising an inlet chamber for gas mixed with dust, an outlet chamber for cleaned gas, said outlet chamber being connected to the suction source, a central outlet between said inlet chamber and said outlet chamber, and a filter unit disposed in said central outlet, said method comprising momentarily establishing a connection between the outlet chamber and the atmosphere to initiate a rapid pressure rise in the outlet chamber, said rapid pressure rise effecting a reversed gas flow through the filter unit in order to blow the filter unit, maintaining a communication between the outlet chamber and the suction source during said rapid pressure rise, and closing an inlet to the inlet chamber concurrently with or immediately before establishing said connection.

2. A method as in claim 1, wherein incoming air from the atmosphere is injected as a jet through the central outlet.

3. A cyclone separator comprising an inlet chamber for gas mixed with dust, the inlet chamber having an inlet, an outlet chamber for cleaned gas, the outlet chamber having means for connecting it to a suction source, a central outlet between said inlet chamber and said outlet chamber, a filter unit in said central outlet, and a closure member within an aperture that connects the outlet chamber to the atmosphere, said closure member biased to closed position by a negative pressure maintained in the outlet chamber by said suction source, and a valve for closing the inlet to the inlet chamber, said valve being coupled to said closure member by an operating member such that when the operating member is actuated said valve closed the inlet to the inlet chamber concurrently or immediately before the closure member opens the aperture connecting the outlet chamber to the atmosphere.

4. A cyclone separator as in claim 3, further comprising a spring connecting said closure member with said operating member, said spring transmitting an opening force to the closure member when the operating member is actuated.

5. A cyclone separator as in claim 3 wherein the filter unit is disposed coaxially in the central outlet, the apertures being located substantially coaxially with the central outlet.

6. A cyclone separator as in claim 3, wherein the filter unit is conical and is disposed coaxially in the central outlet, the aperture being located substantially coaxially with the central outlet.

7. A cyclone separator as in claim 3, further comprising a socket extending from said aperture closed by said closure member, said socket extending towards the central outlet.

8. A cyclone separator as in claim 3, wherein the filter unit comprises a folded filter sheet which is radially displaceable outwards and inwards over at least some part of an axial length thereof.

9. A cyclone separator as in claim 8, further comprising at least one annular support member inside the filter unit to provide local support for the filter unit inside folds of the folded filter sheet.

* * * * *